United States Patent [19]

Kuehn

[11] 4,340,957
[45] Jul. 20, 1982

[54] CARTRIDGE AND HEADSHELL ASSEMBLY

[75] Inventor: John P. Kuehn, Brookfield Center, Conn.

[73] Assignee: Audio Dynamics Corporation, New Milford, Conn.

[21] Appl. No.: 190,801

[22] Filed: Sep. 25, 1980

[51] Int. Cl.³ .......................................... G11B 21/24
[52] U.S. Cl. ................................................ 369/256
[58] Field of Search ............................. 369/170, 256

[56] References Cited

U.S. PATENT DOCUMENTS 2,681,388  6/1954  Goldmark et al. ............. 369/256 X
3,369,816  2/1968  Zahner .............................. 369/256

FOREIGN PATENT DOCUMENTS 51-94202  7/1976  Japan .
690548    7/1979  U.S.S.R. ............................. 369/256

Primary Examiner—Charles E. Phillips
Attorney, Agent, or Firm—Hopgood, Calimafde, Kalil, Blaustein & Judlowe

[57] ABSTRACT

An improved cartridge and head shell assembly which permits separate but simultaneous adjustment of the cartridge overhang, vertical tracking angle and lateral tracking angle by means of a single locking member. The assembly includes a base connector for connection to a tone arm and a pair of upper and lower clamps which clamp both the base connector and an extension from the cartridge holding shell, thereby to permit the cartridge to be moved in accordance with the desired adjustment.

5 Claims, 4 Drawing Figures

CARTRIDGE AND HEADSHELL ASSEMBLY

BACKGROUND AND SUMMARY OF THE INVENTION

The present invention relates generally to phonograph cartridges and, more specifically, to a cartridge and head shell assembly suitable for use with tone arms of the straight-line type.

This invention represents a further development of the cartridge and head shell assembly disclosed in my U.S. patent application, Ser. No. 127,524 filed Mar. 5, 1980, the disclosure of which is hereby incorporated by reference as if fully set forth herein. The prior application was concerned with a unitary cartridge and head shell assembly for use with the older type of J- or S-shaped tone arms including the so-called universal connector. The cartridge and head shell assembly of that application permitted the user to adjust the cartridge overhand and vertical tracking angle separately but simultaneously.

The present invention permits the user to adjust the cartridge overhand, vertical tracking angle and in addition, the lateral tracking angle of the cartridge. All three adjustments can be made and locked by a single lock screw. This cartridge and head shell assembly is designed for use with the straight-line tone arms which do not have a pre-set lateral tracking angle as did the older arms. The present invention also provides the lowest possible mass which is desirable in order to control the resonance frequency of the arm/cartridge system.

It is accordingly an object of this invention to provide an improved cartridge and head shell assembly which permits the cartridge overhang, vertical tracking angle and lateral tracking angle to be adjusted by the user.

It is a further object of the invention to provide an improved cartridge and head shell assembly which permits the overhang, vertical angle and lateral angle adjustments to be made and set by a single clamping member.

It is another object of the present invention to provide a fully adjustable cartridge and head shell assembly suitable for use for straight-line arms.

It is a still further object of this invention to provide a cartridge and head shell assembly that is fully adjustable yet light weight.

To these ends, the present invention is directed to a cartridge and head shell assembly which permits separate but simultaneous adjustment of the cartridge overhang, vertical tracking angle and lateral tracking angle by means of a single locking member.

To the accomplishment of the above and such further objectives as may hereinafter appear, the present invention relates to a cartridge and head shell assembly as set forth in the appended claims, and as described in the following specifications as considered with the accompanying drawing in which:

Figure 1:
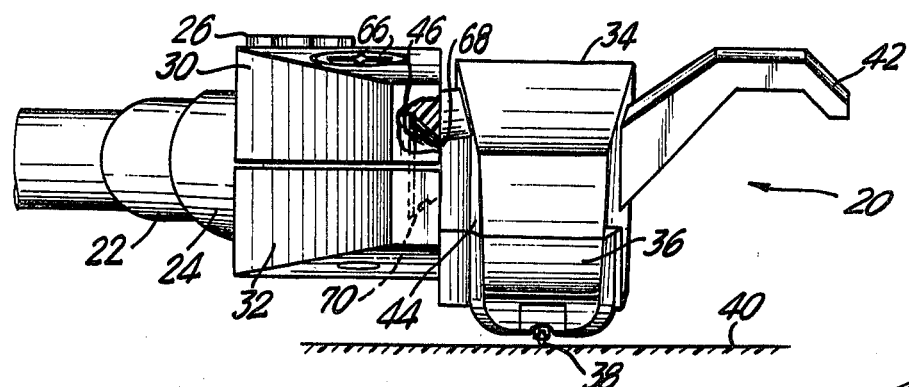
FIG. 1 is a perspective view of the cartridge and head shell assembly shown attached to the forward portion of a straight-line tone arm.
Figure 2:
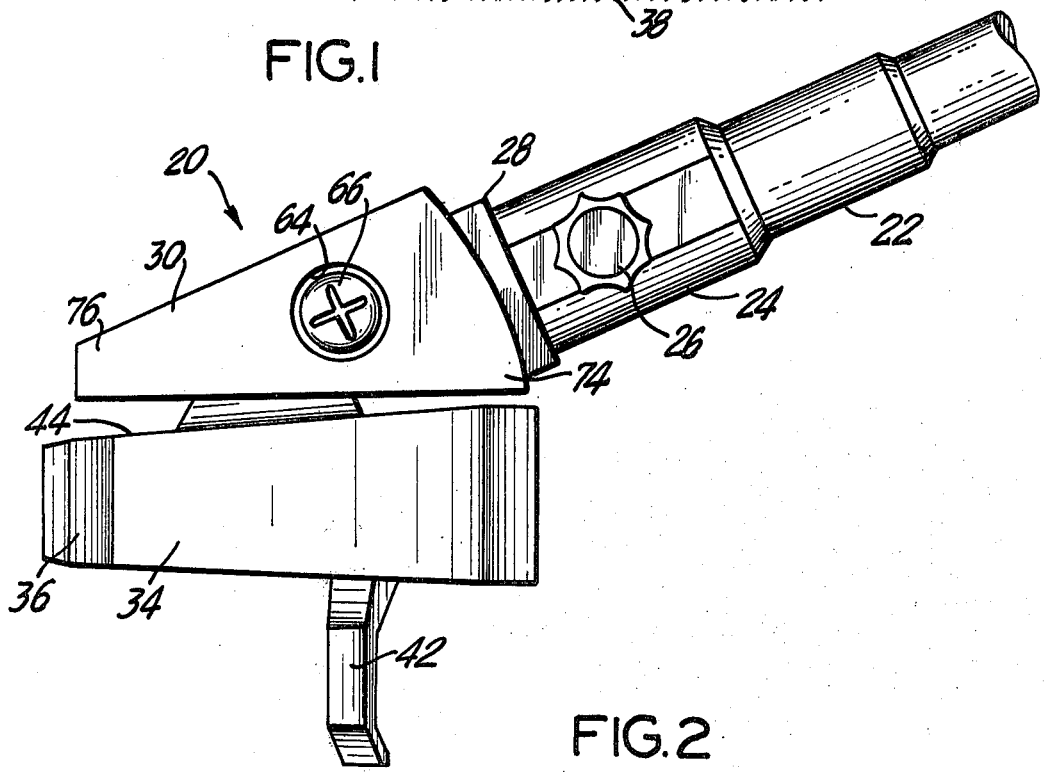
FIG. 2 is a plan view corresponding to that of FIG. 1.
Figure 3:
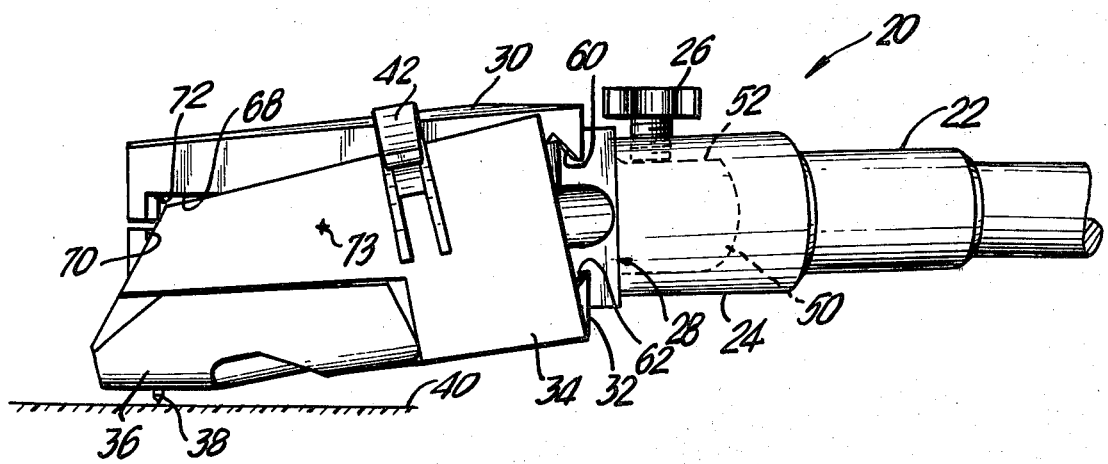
FIG. 3 is a side elevational view corresponding to that of FIG. 1.

The cartridge and head shell assembly of the present invention in accordance with the examplary embodiment illustrated in FIGS. 1-4, is generally indicated at 20 and is shown attached to a straight-line tone arm 22 by means of a coupling 24 and a locking nut 26. The cartridge and head shell assembly 20 includes a connector base 28, an upper clamp 30, a lower clamp 32 and a cartridge shell 34. Cartridge shell 34 mounts a phonograph cartridge 36 including the usual transducer and stylus assembly 38 for contacting the grooves of a record 40. Projecting from cartridge shell 34 is a finger lift 42 to aid in the positioning of assembly 20 and tone arm 22. Cartridge shell 34 has an inner wall 44 and a dovetail post 46 extending therefrom which is circular in cross section.

Figure 4:
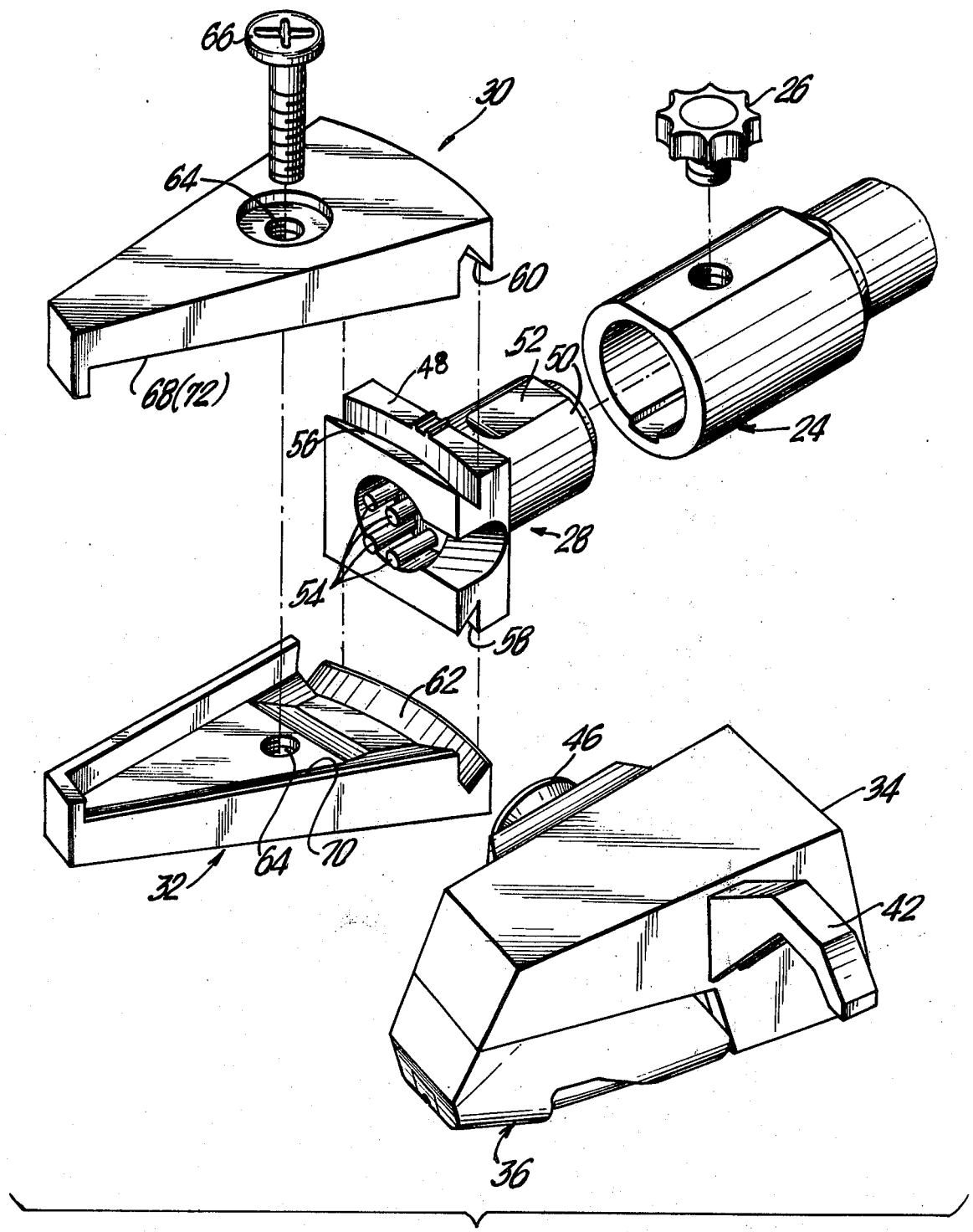
FIG. 4 is an exploded view of the assembly.

Connector base 28 as shown in FIG. 4 includes a forward portion 48 and a rearward portion 50 for insertion within coupling 24 on tone arm 22. A recess 52 is provided in rearward portion 50 so that the end of locking nut 26 may engage the locking nut to maintain the proper positioning of assembly 20. Four pins 54 are provided for electrical connection to the wires (not shown) of tone arm 22, and additional wires (not shown) leading from cartridge 36 are connected to pins 54. Forward portion 48 of connector base 28 includes an upper curved V-shaped groove 56 and a lower curved V-shaped groove 58 for mating with the rearward surfaces of upper and lower clamps 30, 32 respectively.

Upper clamp 30 includes at its rearmost portion a downwardly disposed V-shaped curved lip 60 for engagement with upper curved groove 56 of connector base 28. Similarly, lower clamp 32 includes at its rearmost portion an upwardly extending V-shaped curved lip 62 for mating with lower curved groove 58 on connector base 28. An opening 64 extends through both upper clamp 30 and lower clamp 32 to permit the insertion of a locking screw 66 which locks the position of cartridge shell 34 with respect to all three possible cartridge adjustments; overhang, vertical angle and lateral angle. The center of curvative of lips 60, 62 in upper and lower clamps 30, 32 and corresponding grooves 56, 58 in connector base 28 is located at approximately the position of stylus 38. Thus, as the relative position between clamps 30, 32 is adjusted, the lateral tracking angle of cartridge shell 34 is adjusted.

Upper clamp 30 has a notched edge 68 facing cartridge shell 34 and lower clamp 32 has a notched edge 79 facing cartridge shell 34 which form a dovetail cross section, elongated slot 72 into which the dovetail post 46 extending from cartridge shell 34 is inserted. Accordingly, elongated slot 72 carries dovetail post 46 and permits head shell 34 to be moved rearwardly and forwardly with respect to clamps 30, 32 when lockscrew 66 is loosened. When lockscrew 66 is loosened, cartridge shell 34 is free to pivot about the center 73 of dovetail post 46 to permit the adjustment of the vertical tracking angle. When lockscrew 66 is tightened, the angular and longitudinal portion of cartridge shell 34 with respect to clamps 30, 32 is fixed.

A single lockscrew can generally tighten and hold securely only when the lockscrew is within the area defined by at least three contact points in the members being locked. The longitudinal shifting of post 46 within slot 72 at certain adjustment positions may cause one of the three contact points to appear ahead and behind lock screw 66 at different times. This seemingly violates the requirement for three points of contact about the position of the lock screw. However, by making the diameter of dovetail post 46 slightly larger than the width of slot 72, a slight clearance is produced at all other possible clamping points. Thus, upper and lower clamps 30, 32 act as a sort of teeter-totter so that the effective third point shifts from a position 74 at the rear edge of clamps 30, 32 to a position 76 at the forward edge of clamps 30, 32. The shifting of the point of contact keeps the lock screw 66 contained within the theoretical three-point area. There is a narrow theoretical line near the middle of slot 72 in which the teeter-totter is perfectly balanced. However, the give of the material of the clamps 30, 32 along with the small size of the point of perfect balance removes any possibility of difficulty. A suitable material for each of the elements of assembly 20 is electrically conductive "carbon fiber" material. However, other suitable materials may be used.

Thus it is seen that the present invention provides an improved means for adjusting a phonograph cartridge for precise overhang, vertical tracking angle and lateral tracking angle. All of these adjustments can be made by loosening a single screw and locking of the adjustments is performed by the same screw.

Although the present invention has been described in conjunction with a preferred embodiment, it is to be understood that modifications and variations may be resorted to without departing from the spirit and scope of the invention as those skilled in the art will readily understand. Such modifications and variations are considered to be within the purview and scope of the invention and appended claims.

What is claimed is:

1. A phonograph cartridge and head shell assembly for attachment to a tone arm, said assembly comprising:
   a fixed part releasably coupled to said tone arm,
   a movable part joined to said fixed part, said movable part including a stylus and transducer assembly,
   means for permitting said movable part to be laterally angularly displaced with respect to said fixed part, and
   single means for permitting said movable part to be longitudinally and vertically angularly displaced with respect to said fixed part, said single means including first and second clamp means, at least one of said first and second clamp means having a recess, the other of said first and second clamp means cooperating with said at least one clamp means to define an elongated slot, said movable part having a projection receivable within said elongated slot, means for retaining said projection within said elongated slot, and means for locking said movable means against rotation about said projection and against displacement along said slot.

2. The assembly as claimed in claim 1, wherein said projection is frustro-conical in configuration having its narrowest portion joined to said movable part, said elongated slot including diverging walls for engaging said frustro-conical projection.

3. The assembly as claimed in claim 1, further including a single locking means for locking said movable part against longitudinal, vertical angular and lateral angular displacement with respect to said fixed part.

4. The assembly as claimed in claim 1, wherein said means for permitting said lateral angular displacement include upper and lower curved grooves disposed on said fixed part, upper and lower clamp means having projections receivable in said upper and lower grooves, said projections being slidably displaceable in said grooves, thereby to angularly displace said movable part with respect to said fixed part, and means for locking said projections with respect to said grooves.

5. The assembly as claimed in claim 1, wherein said projection has a diameter slightly greater than the width of said elongated slot, so that said first and second clamp means may deform about said projection.

* * * * *